United States Patent [19]
Muscara

[11] Patent Number: 5,464,047
[45] Date of Patent: Nov. 7, 1995

[54] METHOD AND APPARATUS FOR DISPENSING PAINT INTO CONTAINERS

[75] Inventor: Dominic Muscara, Iselin, N.J.

[73] Assignee: Benjamin Moore & Co., Montvale, N.J.

[21] Appl. No.: 185,030

[22] Filed: Jan. 24, 1994

[51] Int. Cl.⁶ ..................................................... B65B 3/28
[52] U.S. Cl. ................... 141/1; 141/83; 141/102; 141/128; 141/156; 141/189; 141/196
[58] Field of Search .................. 141/1, 83, 102, 141/128, 153, 156, 188, 189, 196; 177/53, 60, 89, 119, 122

[56] References Cited

U.S. PATENT DOCUMENTS

| | | | |
|---|---|---|---|
| 3,557,889 | 1/1971 | Rejsa | 141/83 X |
| 3,985,266 | 10/1976 | Wright, Jr. | 222/22 |
| 4,023,021 | 5/1977 | Kuschel | 235/151.33 |
| 4,211,263 | 7/1980 | Kennedy et al. | 141/83 |
| 4,467,844 | 8/1984 | Di Gianfilippo et al. | 141/1 |
| 4,648,430 | 3/1987 | Di Gianfilippo et al. | 141/1 |
| 4,676,282 | 6/1987 | Bellini et al. | 141/1 |
| 4,705,083 | 11/1987 | Rossetti | 141/83 X |
| 5,148,841 | 9/1992 | Graffin | 141/83 |
| 5,156,194 | 10/1992 | von Nehring et al. | 141/1 |
| 5,159,959 | 11/1992 | Bohm | 141/1 |
| 5,287,896 | 2/1994 | Graffin | 141/83 X |
| 5,309,955 | 5/1994 | Torterotot | 141/1 |

FOREIGN PATENT DOCUMENTS

| | | | |
|---|---|---|---|
| 0298407 | 1/1989 | European Pat. Off. | 141/83 |
| 9015755 | 12/1990 | WIPO | 141/196 |

*Primary Examiner*—J. Casimer Jacyna
*Attorney, Agent, or Firm*—William E. Mouzavires

[57] ABSTRACT

A method of supplying a plurality of containers with liquid including the steps of introducing into a first container a first percentage of a predetermined final amount and subsequently introducing in steps additional liquid until said predetermined amount is reached, introducing into a second container a percentage of said predetermined amount greater than the initial percentage introduced into said first container and then introducing additional liquid into said second container in steps until said predetermined amount is reached, and continuously introducing into a third container an amount of liquid within a tolerance of said predetermined amount, and wherein the amounts of liquid introduced into the container are measured and determined by weight. A microprocessor connected in circuit with a scale is used to control a valve through which the liquid is introduced into the container.

10 Claims, 4 Drawing Sheets

5,464,047

METHOD AND APPARATUS FOR DISPENSING PAINT INTO CONTAINERS

BACKGROUND OF INVENTION

Numerous methods and apparatus for introducing liquid into containers exist in the prior art. Such methods and apparatus utilize various controls and measurements for determining when a desired amount of liquid has been introduced into the container. Included in such systems are photoelectric, volumetric, ultrasonic and weight measurements and controls. More recently in the paint industry, ultrasonic controls have been used to sense the level of the paint as it rises in the container and to initiate a signal to close the fill valve when a certain level has been reached. However, one of the problems with ultrasonic controls is that they are not sufficiently accurate to insure that a predetermined amount of paint is introduced in the container. Another problem is that ultrasonic controls are limited as to the range of measurement thereby increasing the time it takes to fill a container. In addition, some ultrasonic controls are relatively expensive and suffer other problems due to bubbling or frothing at the surface of the paint in the container; and the location of the sensor adjacent the fill valve atop the container.

OBJECTS OF THE PRESENT INVENTION

The present invention relates to methods and apparatus for introducing predetermined amounts of liquids in containers, and although not limited thereto, is particularly useful for filling paint containers such as cans with paints or similar coatings.

An object of the present invention is to provide a novel and improved method and apparatus for introducing a predetermined amount of liquid in a container. Included herein is such a method and apparatus which avoids the aforementioned problem of ultrasonic control systems associated with filling machines.

A further object of the present invention is to provide a novel and improved method and apparatus for supplying containers with a predetermined amount of liquid in a highly accurate manner and yet are suitable for commercial, high speed production.

SUMMARY OF INVENTION

To summarize one preferred form of the invention, a plurality of empty containers such as paint cans are conveyed onto weight scales whereupon the weights of the containers are stored in a microprocessor so as to be excluded from subsequent weight measurements of liquid introduced into the containers. Once the containers are in position, a filling valve over a first container is opened to initiate the downward flow of liquid from a batch into the container until a percentage, preferably 80 to 90%, of a predetermined final weight is introduced whereupon, additional liquid is introduced until the predetermined amount is reached within a predetermined tolerance preferably plus or minus 0.30 to 0.50 ounces of paint. After the first container is supplied, the process is repeated to supply liquid from the same batch to a second container with the exception that the percentage of liquid initially introduced into the second container is greater than the first percentage introduced in the first container. Preferably, the second percentage is 90 to 95% of the predetermined final weight. After the second container is supplied, a third container is continuously supplied with liquid from the same batch without interruption until the predetermined final weight is reached within the aforementioned tolerance of plus or minus 0.30 to 0.50 ounces of liquid. Subsequently, all other containers to be supplied with liquid from the same batch are supplied in the same manner as the third container, that is, they are continuously supplied without interruption until the final weight is reached within the aforementioned tolerances. The above method is automated with the use of electronic scales in circuit with a microprocessor and fill valves controlled preferably by pneumatic actuators in turn controlled by solenoids.

DRAWINGS

Other objects and advantages of the present invention will become apparent from the following more detailed description of a preferred form of the invention taken in conjunction with the attached drawings in which.

DETAILED DESCRIPTION

Figure 1:
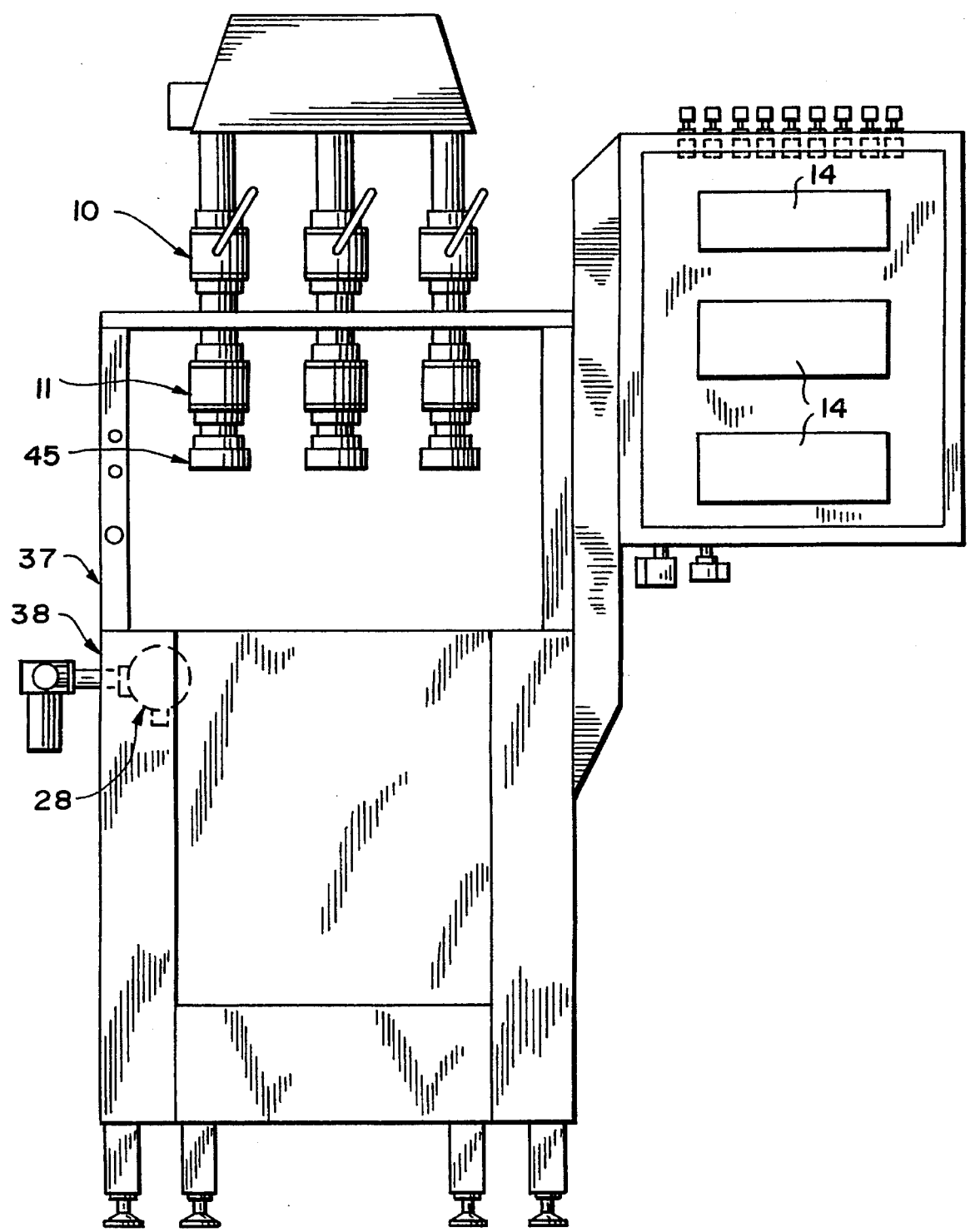
FIG. 1 is a front elevational view of preferred apparatus for carrying out the method of the present invention.

Referring now to the drawings, one preferred method in accordance with the present invention utilizes a plurality of filling valves 11 and associated nozzles 45, there being three shown in the drawings. Containers such as paint cans to be filled with a liquid such as paint are conveyed on to weight scales, preferably electronic weight scales 17, from a supply area 44 adjacent the scale. In the preferred embodiment shown, three individual scales are provided respectively below the filling nozzles 45 so that the weight of each of the containers is individually measured as will be described below. When the containers are initially conveyed to the filling station under the filling nozzles 45, the weight of the containers is measured and stored so that later when the weight of the paint is introduced into the containers being measured, the weight of the cans will not be included.

In accordance with the method of the present invention, a predetermined desired weight of paint is to be sequentially introduced into the containers from the same supply batch 100. The filling operation commences with a first container which is initially filled with paint from the associated valve 11 and nozzle 45 until a percentage, preferably 80%, of the predetermined weight is introduced into the container. This is measured by the associated scale 17 which, through an associated circuit 90 (FIG. 4), sends a signal to operate a valve actuator 52 associated with valve 11 to close the valve. Subsequently valve 11 is opened and closed intermittently and quickly to introduce additional amounts of paint into the first can until the predetermined desired weight is reached within an acceptable tolerance, preferably plus or minus 0.30 to 0.50 ounces of paint. The second container is next filled with paint until preferably 90% of the predetermined final amount is introduced whereupon the associated fill valve is closed and additional amounts of paint are introduced in quick, intermittent steps until the predetermined final amount is reached within the aforementioned tolerance. During the aforementioned fillings of the first and second containers, a microprocessor, knowing the predetermined desired weight, the actual weight delivered into each container, and the amount of paint introduced in each of the incremental filling steps, calculates the amount of paint that is still left in the air between the nozzle and the container when the filling valve is closed after dispensing 80% of the predetermined weight. Having this information the microprocessor causes the scale under the third container to be reset to cut off the fill valve when the scale senses a weight just short of the predetermined weight. Thus, the third container can be filled continuously without any intermittent stoppages until the predetermined amount is reached within a tolerance preferably plus or minus 0.30 to 0.50 ounces. As long as paint is being supplied from the same batch which usually has the same density, consistency and other flow characteristics, all containers subsequent to the third container are filled in one step in the same manner within the aforementioned tolerances. Although an 80% prefill is preferred for the first container, another percentage between 80% and 90% may also be used. The second container may be prefilled to a percentage between 90% and 95%. Whatever values are chosen must be incorporated in the data or program of the microprocessor to enable it to compute a "valve cut off weight" for the third and subsequent containers as will be described further below.

Figure 4:
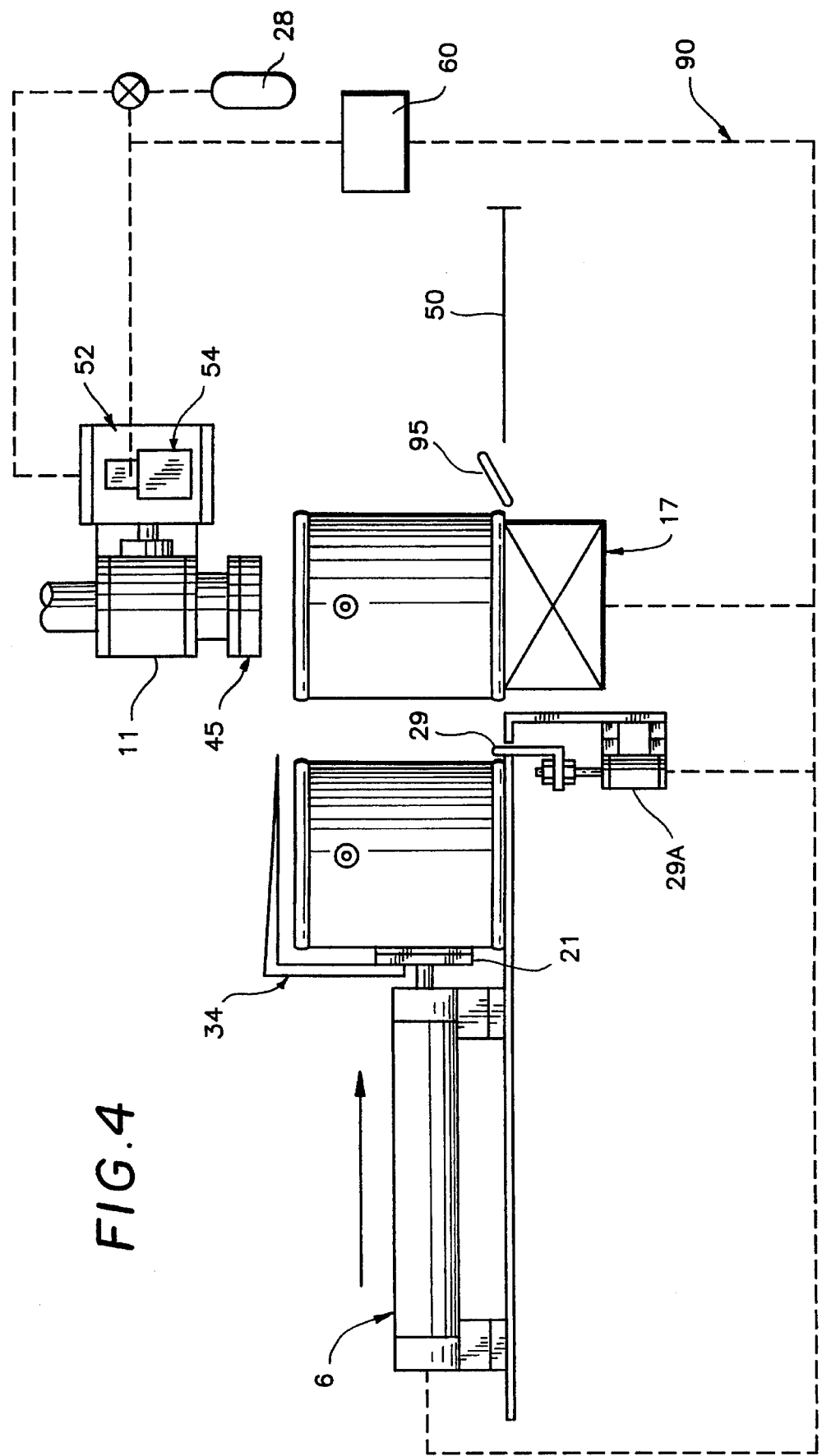
FIG. 4 is a schematic view of portions of the apparatus as included in a system which is shown in dotted lines.

Preferred apparatus for carrying out the aforementioned method of the present invention is shown in the drawings, and with reference to FIG. 1, it includes the fill valves 11 and nozzles 45 overlying a fill station in which three scales are provided corresponding to the three fill valves and nozzles. Valve 11 and fill nozzles 45 are mounted in an upper frame 37 which in turn is supported on a lower frame 38. Manually operated valves 10 are also provided in the preferred embodiment as shown in FIG. 1. Supported by the upper and lower frames is a control box generally designated 18 including electrical and pneumatic circuitry, a microprocessor 60 and weight controls 14. FIG. 1 also shows an air tank 28 which is used to supply pneumatic actuators 52 (see FIG. 4) which are used to actuate the fill valves 11 between open and closed positions. In the preferred embodiment, valve actuators 52 are in turn controlled by solenoids 54 as shown in FIG. 4. Also as shown in FIG. 4, the scales 17 are connected in circuit 90 with the solenoids 54 to control them in response to weight sensed by the scales.

In the preferred embodiment, the paint containers are conveyed from the supply area 44 to the scales by means of a pusher 21 comprised of a vertical plate actuated by a pneumatic motor or cylinder 6. When pusher 21 is extended from the position shown in FIG. 1 (not shown), it will push three containers simultaneously on to the three scales. Element 43 shown in FIG. 3 serves as a guide for the incoming cans. At this point an automatic zero tracking system will "tare" the weight of the containers so that in subsequent measurements of the weight of paint introduced into the container, the weight of the container itself will not be included. In the preferred apparatus, each of the scales is a 6" by 6" diamond-base type manufactured by WEIGH-TRONIX of Landing, N.J. which also supplies the microprocessor ("batch controller") and the program under the designation WI120B.

Figure 2:
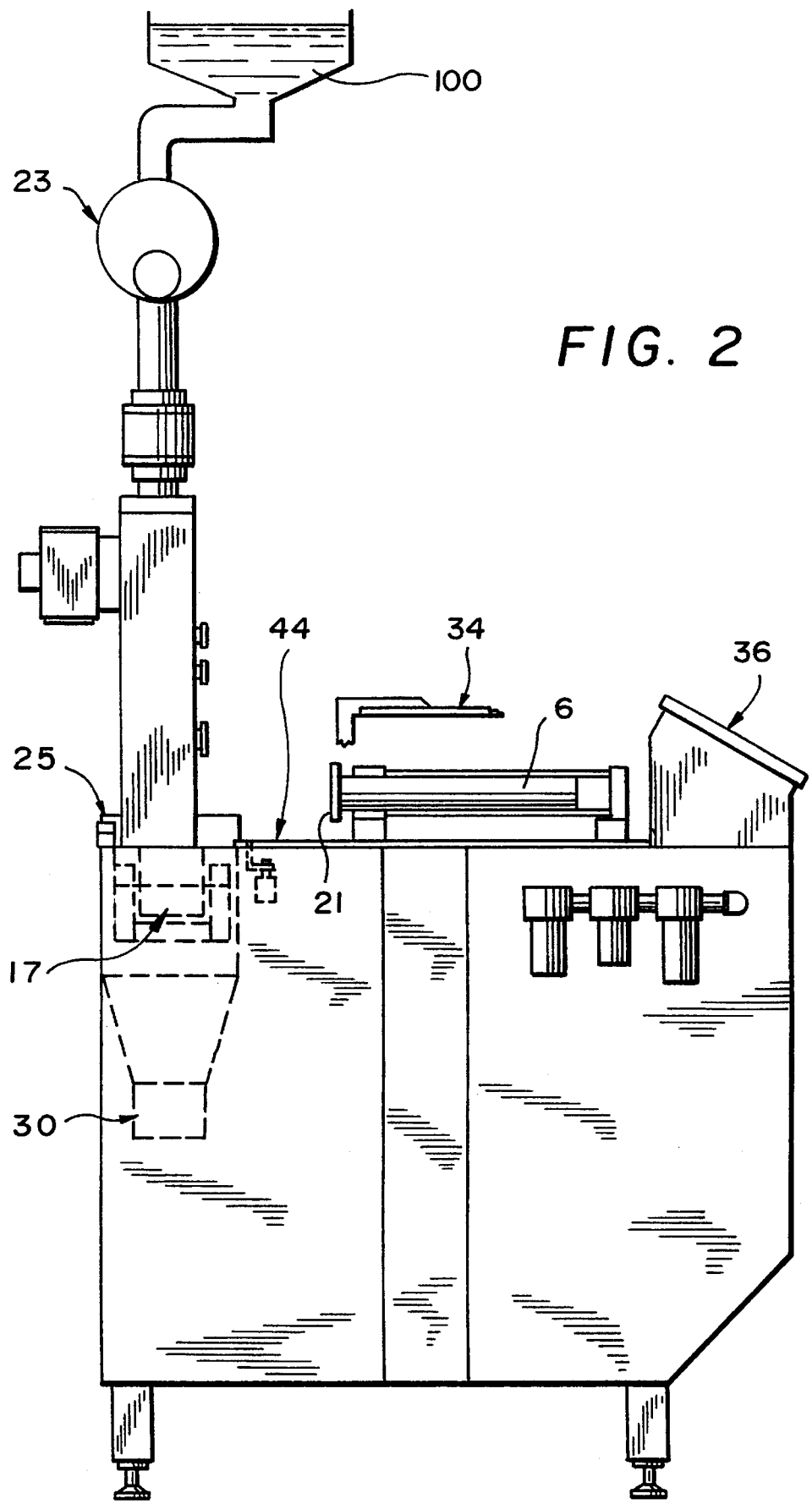
FIG. 2 is a side elevational view of the apparatus shown in FIG. 1.

After the containers are pushed in position on the scales limit switch 1 will be actuated and the pusher 21 is retracted causing a limit switch such as 5 (FIG. 3) to be actuated by a cam 2 (see FIG. 3) to open the fill valve 45 associated with the first container to commence filling the container with paint from a paint manifold 23 (FIG. 2) which in turn is supplied by a batch of paint 100 (see FIG. 2). The filling proceeds until preferably 80% of the predetermined weight is reached whereupon the scale 17 associated with the first container senses the weight and sends a signal to the solenoid 54 associated with the valve actuator 52 to close the valve 11. Subsequently the valve 11 is intermittently opened and closed quickly until the predetermined desired amount of paint within the tolerance has been introduced into the first container as determined by the scale 17. During the aforementioned fill, the characteristics of the fill including the amount of paint added in increments after the 80% is recorded by the microprocessor.

After the first container is filled with the predetermined amount, the control system automatically initiates flow of the second container which continues until preferably 95% of the predetermined fill weight has been introduced into the container. Subsequently additional amounts are quickly and intermittently introduced into the second container until the predetermined amount is reached within the aforementioned tolerances. During this fill operation, the computer records the characteristics of the fill and then averages the characteristics with those of the first fill at the first container, then calculates what will be termed here a "valve cut-off weight" slightly less than the predetermined weight for use in sending a signal to the valve actuators in subsequent fills to close the valve at the time the valve cut-off weight is reached. Thus the third and all subsequent containers to be filled from the same batch of paint 100 may be filled in a one-step operation which is terminated when the valve cut-off weight is sensed by the scale associated with the third container. After the third container is filled, the microprocessor will cause all of the scales 17 to be reset to close the fill valves 11 in subsequent filling operations at the valve cut off weight.

After three containers have been filled, can pusher 21 is actuated to extend it to a second extended position beyond the scales where it pushes the three containers over a teeter bar 95 to a discharge area generally defined by a horizontal surface 50 on the side of the scales 17 opposite the pusher 21 as best shown in FIG. 4. Once the containers move sufficiently over the teeter bar 95, they will pivot over the teeter bar to disengage from the scales thus speeding the resetting of the scale to zero and in turn speeding the overall production. The filled containers are then removed from the discharge area 50 in any suitable manner.

Figure 3:
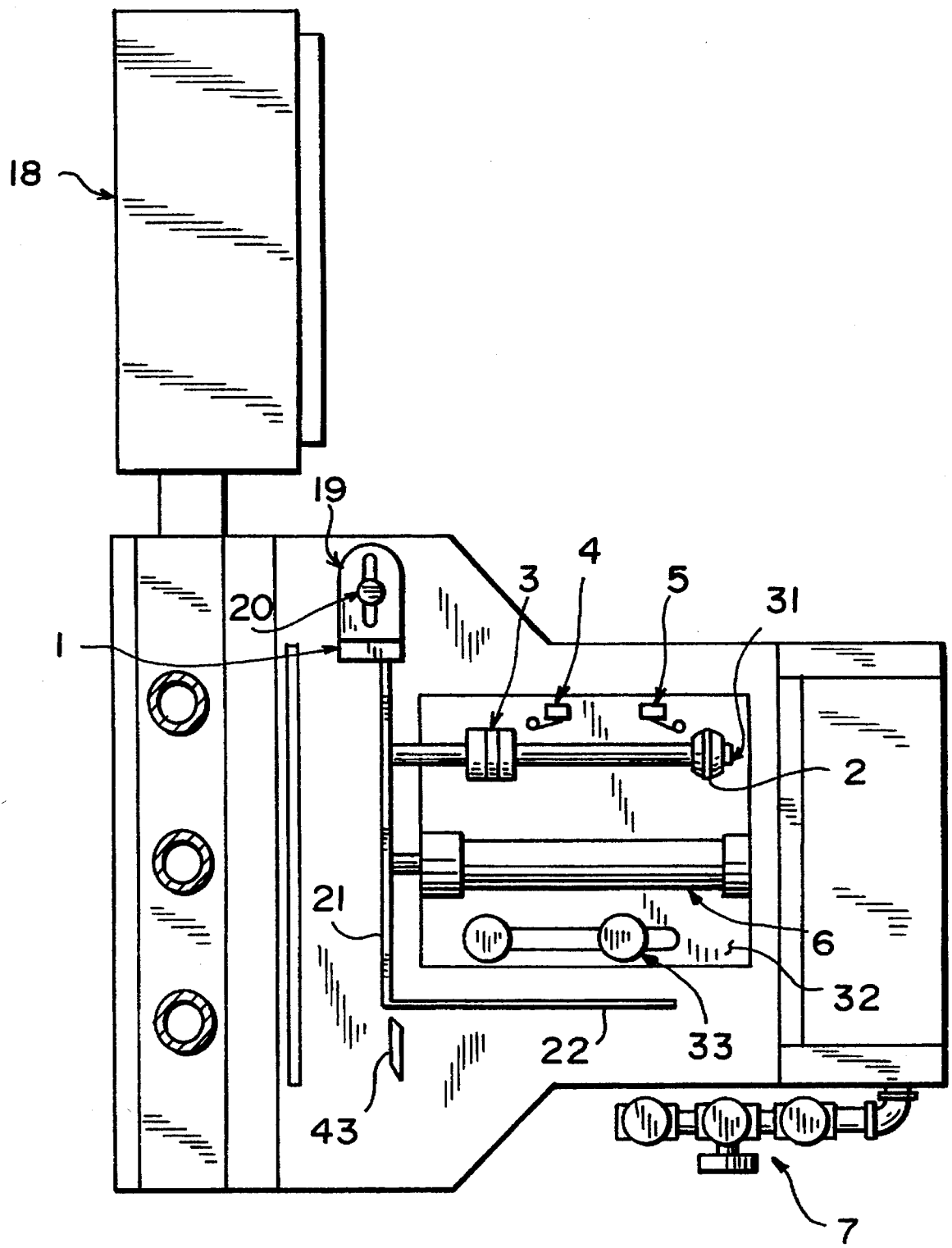
FIG. 3 is a plan view of the apparatus.

In the preferred apparatus, a vertically movable gate 29 is provided between the container supply area and the scales as best shown in FIGS. 3 and 4. Gate 29 is moved by an actuator 29a in the control circuit 90 shown in FIG. 4 between a retracted position where it is below the level of the surface of the scales and the supply surface 44 and a raised position where it extends above the supply surface to prevent incoming empty cans from engaging the cans on the scales. Gate 29 in its raised position may also be used as a guide for guiding the incoming cans into position on the supply surface 44 just prior to being pushed on to the scales. When the third container is filled, the associated scale will send a signal through the circuit that will cause the gate 29 to be lowered and the can pusher 21 extended to push the three cans from the scales to the discharge area 50 while passing over the teeter bar 95.

Referring to FIGS. 2 and 4, the preferred apparatus of the present invention also includes a drip shield 34 in the form of a generally horizontal plate 34 fixed to and above the pusher 21 to be movable therewith while overlying containers such as shown in FIG. 4 to prevent drips of paint from the fill nozzles 45 contacting the tops of the containers. It is also preferred that a drip collector pan 30 be incorporated in the lower frame 38 below the scales as shown in FIG. 2. In addition it is preferred that a plurality of horizontally extending guides in the form of vertical plates be provided on opposite sides of the scales 17 to further guide and properly position the containers on the scales. Portions of one of the guides is shown at 25 in FIG. 2.

As best shown in FIG. 3, the preferred apparatus also utilizes a pusher assembly including a horizontal base in the form of a plate 32 on which is mounted the pneumatic actuator 6 and the pusher 21. A guide rod 31 fixed to the pusher is slidably mounted in a suitable bearing 3 fixed to plate 32. When the pusher 21 pushes the cans into filling position on the scales, cam 2 on pusher rod 31 will activate switch 4 to retract the pusher rod 31, and when switch 5 is actuated by cam 2, the fill valve will open to commence filling. The position of plate 32 on table top 44 is adjustable and once the desired position is achieved, plate 32 is secured relative to table 44 by hold-down screws 33. FIG. 3 also shows air filters 7 utilized in conjunction with the pneumatic system. FIG. 3 also shows bracket 19 holding limit switch 1 and a screw 20 securing the bracket 19 in position. In addition the preferred apparatus includes a vertical plate 22 fixed to the pusher 21 at right angles as shown in FIG. 3 to prevent advancement of incoming empty cans until pusher 21 is fully retracted.

A control panel is shown at 36 in FIG. 2 however it should be understood that once the predetermined desired weight to be introduced into the containers is punched into the system by the operator of the machine, the entire operation is automatic during which time weight values may be seen at the readout located at 14 in the control box (see FIG. 1).

It will be seen from the above that the present invention provides an extremely accurate method and apparatus for filling containers with liquids preferably paint cans with paint in a fully automated manner highly suitable for commercial production.

Although preferred embodiments of the present invention have been shown in the drawings and described above, it should be understood that the scope of the present inventions is not limited to the specific forms disclosed but rather is defined in the claims appended below to this application as well as continuation applications that may be filed.

What is claimed is:

1. A method of supplying a plurality of containers with liquid, the method comprising in combination, selecting a predetermined amount of liquid to be introduced into each of the containers, introducing into a first container a first percentage of said predetermined amount and subsequently introducing in steps additional liquid until said predetermined amount is reached, introducing into a second container a percentage of said predetermined amount greater than the initial percentage introduced into said first container and then introducing additional liquid into said second container in steps until said predetermined amount is reached, and continuously introducing into a third container an amount of liquid within a tolerance of said predetermined amount, and wherein the amounts of liquid introduced into the first container are measured and determined by weight.

2. The method defined in claim 1 including the step of placing the containers on a weight scale.

3. The method defined in claim 2 wherein the containers are initially introduced on the weight scale when they are empty and discharged from the weight scale after they are supplied with said predetermined amount, and wherein said containers are pushed off an edge of the weight scale and tipped about an edge to allow the weight scale to be reset.

4. The method defined in claim 1 wherein in measuring the weight of the liquid in the first container, the weight of the container is not included in the measurement.

5. The method defined in claim 4 including the steps of using: a valve to control the flow of liquid into the containers, a weight scale to determine the weight of liquid supplied into the container, and a microprocessor in circuit with the scale and the valve to control the opening and closing of the valve.

6. The method defined in claim 5 wherein empty containers to be supplied with paint are introduced onto the scale by a retractable conveyor which upon retracting from the scale initiates a signal to open said valve to commence flow of liquid in the containers.

7. The method defined in claim 1 wherein said tolerance is approximately plus or minus 0.30 to 0.50 of an ounce of liquid.

8. The method defined in claim 1 wherein said liquid is paint supplied to each of said containers from the same batch of paint.

9. The method defined in claim 1 including the steps of using: a valve to control the flow of liquid into the containers, a weight scale to determine the weight of liquid supplied into the container, and a microprocessor in circuit with the scale and the valve to control the opening and closing of the valve.

10. The method defined in claim 1 including the step of introducing liquid into a subsequent fourth and successive containers from the same supply of liquid and stopping the flow of liquid into each subsequent container when the cut-off weight has been reached.

* * * * *